United States Patent [19]

De Laquil, III

[11] Patent Number: 4,777,934

[45] Date of Patent: Oct. 18, 1988

[54] HIGH TEMPERATURE SOLAR RECEIVER

[75] Inventor: Pascal De Laquil, III, Livermore, Calif.

[73] Assignee: Bechtel National, Inc., San Francisco, Calif.

[21] Appl. No.: 28,809

[22] Filed: Mar. 20, 1987

[51] Int. Cl.[4] .............................................. F24J 2/30
[52] U.S. Cl. ................................. 126/435; 126/450; 126/900
[58] Field of Search ............... 126/418, 435, 449, 450, 126/451, 452, 900

[56] References Cited

U.S. PATENT DOCUMENTS

| | | | |
|---|---|---|---|
| 4,095,118 | 6/1978 | Rathbun | 290/2 |
| 4,312,324 | 1/1982 | Ross et al. | 126/418 |
| 4,313,304 | 2/1982 | Hunt | 60/641.8 |
| 4,403,601 | 9/1983 | Hunt | 126/435 |
| 4,452,771 | 6/1984 | Hunt | 423/450 |
| 4,499,893 | 2/1985 | Hunt et al. | 126/449 |

Primary Examiner—Stephen F. Husar
Attorney, Agent, or Firm—Townsend & Townsend

[57] ABSTRACT

A solar central receiver includes a radiation receiver comprising a housing having an open aperture in one wall. An atmospheric airstream having a preselected concentration of particles is directed through the receiver and heated by focused solar radiation entering through the aperture. The particles are heated and, in turn, heat the airstream to a high temperature, typically 700° C. and above. A compressed airstream is then heated by the heated airstream in a suitable heat exchanger. The heated compressed airstream may be used for any purpose, typically for driving a turbine and generator set. The turbine also drives a compressor which supplies the initial compressed air. Usually, the turbine exhaust is used as the inlet airstream to the radiation receiver. An auxiliary airstream and, optionally, an air curtain may be used to buffer and protect the particle-laden airstream from disturbance from the ambient, typically from high winds.

11 Claims, 3 Drawing Sheets

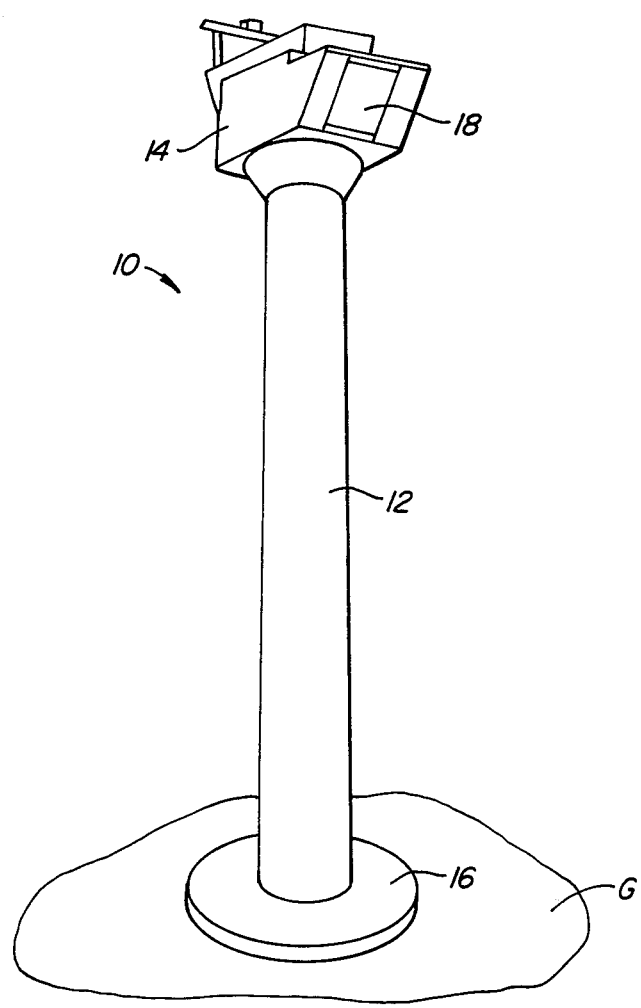
FIG._1.

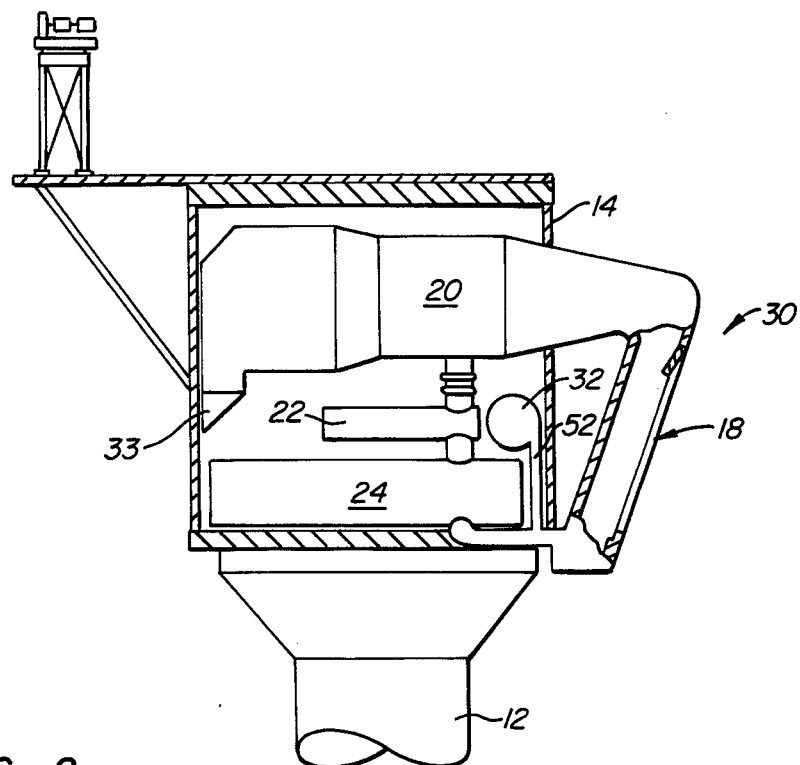
FIG._2.
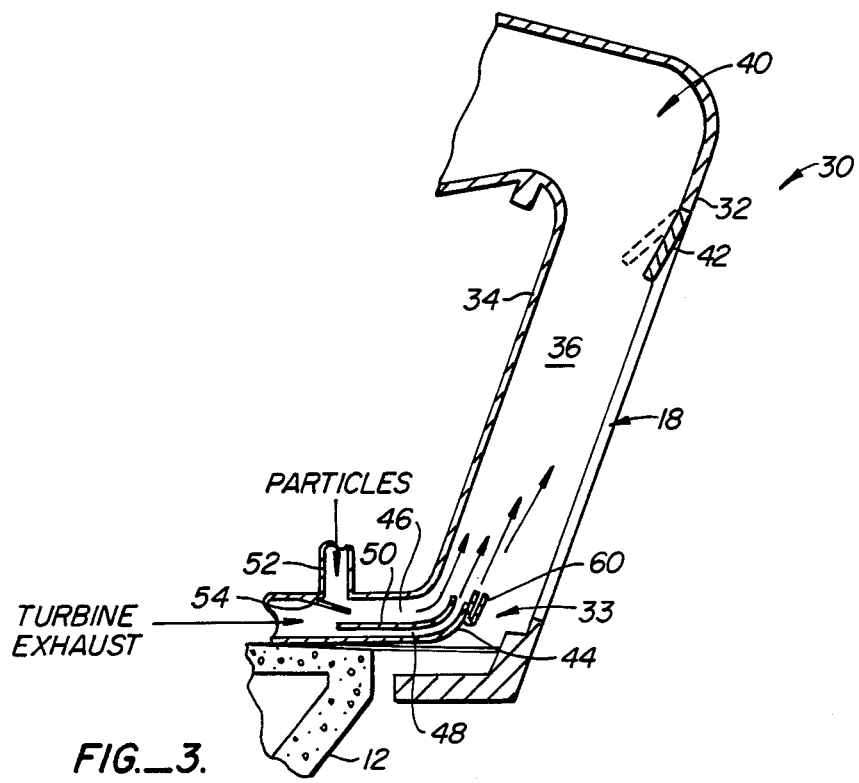
FIG._3.

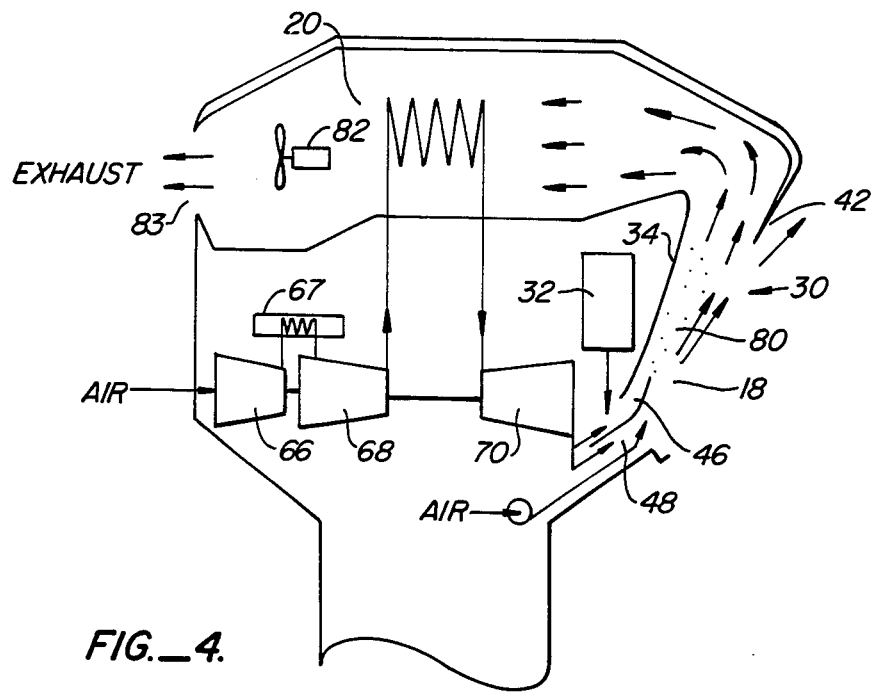
FIG._4.
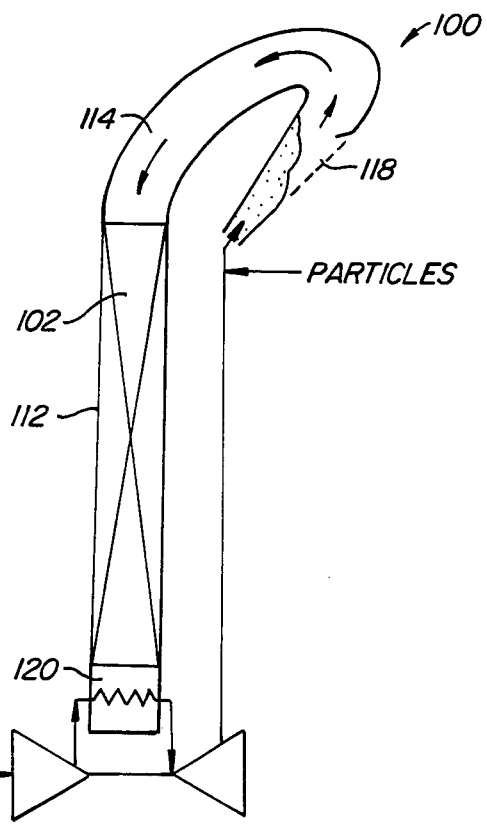
FIG._5.

HIGH TEMPERATURE SOLAR RECEIVER

BACKGROUND OF THE INVENTION

1. Field of the Invention

The present invention relates generally to the construction and operation of solar receivers capable of exposing a flowing stream containing suspended, energy-absorptive particles in the air to focused solar radiation. More particularly, the invention relates to a design of a solar receiver in which the particles are exposed through an open aperture in the receiver.

Power generation using a field of heliostats to focus solar radiation on a central receiver tower has been demonstrated. Current receiver designs expose metal-tubed heat exchangers to the solar radiation and either generate steam directly by heating water in the exchangers or use nitrate salts or liquid sodium as an "intermediate" energy absorbing fluid and transfer the energy to water in order to generate steam for a Rankine-cycle power plant.

Solar receivers to heat air have been proposed which expose ceramic tubes to the solar radiation. However, these systems are unattractive because ot their high cost, large technical risk and low receiver efficiency.

An alternate approach has been suggested for efficiently heating air to a high temperature and using the heated air with a Brayton-cycle gas turbine to generate electricity. Submicron carbon particles suspended in air are exposed to solar radiation from a focused heliostat field. Because of their small size, the particles efficiently absorb the radiation and heat the surrounding air by conduction. The carbon particles eventually become oxidized, leaving a clean, heated airstream. The heated airstream may be used to drive a Brayton-cycle gas turbine which is coupled to an electrical generator.

Compared to solar Rankine-cycle systems, solar Brayton-cycle (gas turbine) systems have the following advantages. They are simple power conversion systems with higher reliability and lower operating and maintenance costs. They can be commercially attractive at smaller sizes. Their inherent low water requirements increase the siting potential for central receivers in arid regions. They are more easily adaptable to fossil hybrid operation which increases the plant availability.

Although the use of solar radiation to heat a suspension of carbon particles promises a significant improvement in the efficiency of solar electrical generation, development of such systems has been hindered because of high cost, fabrication difficulties, and operational limitations associated with the very large windows required for commercial systems. Such windows may be from 5 to 10 meters across, or larger, and must be able to withstand the very high air temperatures which appear to be achievable. Such windows would be very expensive if they are available at all.

Thus, it would be desirable to provide solar receivers which do not require the use of high temperature transparent windows for containing the carbon particle-laden airstream. In particular, it would be desirable to provide solar receivers capable of exposing the particulate-laden airstream through an open aperture.

2. Description of the Background Art

U.S. Pat. No. 4,095,118, to Rathbun describes a self-contained solar power generation system wherein a compressor, particle generator, turbine, and solar receiver are located in a central tower positioned to receive sunlight from a mirror field on the ground. The receiver includes a transparent window to contain the particle-laden working fluid. U.S. Pat. Nos. 4,313,304 and 4,403,601 to Hunt describe a solar receiver having a transparent window and a transparent heat shield. The heat shield is mounted inside the receiver and defines two chambers. By directing clean air througn the chamber between the window and the shield, and particle-laden air through the central chamber, the window is protected from excessively high temperatures. An alternate solar receiver design is described in U.S. Pat. No. 4,499,893 to Hunt et al. A small quartz window at the bottom of the receiver defines a focal plane capable of receiving light from a 360° field. Although minimizing the quartz required for the window, the design further requires a quartz outlet tube to collect heated gases after they have been exposed to solar flux. U.S. Pat. No. 4,452,771 to Hunt and Department of Energy bulletin DOE/TIC/EG-85/046 describes an improved carbon particle generator for use in solar energy systems of the type just described.

SUMMARY OF THE INVENTION

According to the present invention, a radiation receiver useful for a solar central receiver tower includes a housing, means for inducing a flow of particle-laden air through the housing, and means for simultaneously inducing flow of a clear auxiliary airstream through the housing adjacent the particle-laden airstream. Optionally, means may also be provided for inducing the flow of an air curtain through the housing adjacent the auxiliary airstream. The housing includes an open aperture in one wall, and the particle-laden gas is heated by exposure to solar radiation focused through the aperture. In particular, the particles in the particle-laden airstream absorb the solar radiation, transfer heat to the airstream by conduction, and eventually are oxidized. By leaving the aperture completely open, that is without any window or lens, highly efficient radiative heat transfer is achieved. Moreover, the airstream can be heated to very high temperatures without any limitations derived from the temperature tolerance of the window or lens material.

To inhibit mixing of ambient air with the particle-laden airstream, the auxiliary airstream comprising substantially clear air is injected in the plane of the aperture between the particle-laden air and the ambient. The auxiliary airstream moves at substantially the same velocity as the particle-laden airstream and acts as a sacrificial layer which is diverted from the receiver prior to utilization of the heated airstream. For this purpose, a diverter plate is positioned at the exit end of the aperture. The diverter plate is adjustable to skim a portion of the airflow which is cooler than the main flow.

In addition, disturbances to the particle-laden airstream caused by winds which would be expected during normal operation of the solar central receiver can be inhibited by the air curtain. The air curtain will usually have a mass flow rate at least equal to and up to twice that of the particle-laden airstream and a velocity which usually exceeds that of the particle-laden and auxiliary airstreams. In this way, the air curtain acts as a barrier to prevent loss of the heated airstream, which otherwise could result in a heat loss of trom 2 to 6 percent.

The receiver may be used in a Brayton-cycle gas turbine system for generating electricity, where the system further includes an air-air heat exchanger, a turbine generator, and a particle generator. Particles, usually pyrolyzed carbon particles, are injected into an airstream at atmospheric pressure, and the particle-laden airstream is passed through the solar receiver where it is heated, typically to temperatures in the range from about 600° to 2000° C. A compressed airstream is then heated by the heated airstream in the air-air heat exchanger, and the hot atmospheric pressure compressed airstream used to drive a turbine-generator. Exhaust air from the turbine generator may then be used as the airstream into which particles are injected. In this way, electricity may be generated in a highly efficient and economic manner.

In addition to electricity generation, the receiver can be used in a system to produce fuels or energy-intensive chemicals using a convectively heated process reactor in place of the air-air heat exchanger. Alternatively, the receiver could supply heat, in the form of high temperature, atmospheric pressure air, to an industrial process.

BRIEF DESCRIPTION OF THE DRAWINGS

FIG. 1 illustrates a central receiver tower having the radiation receiver of the present invention at the upper end thereof.

FIG. 2 is an elevational view of the equipment enclosure at the upper end of the central receiver tower of FIG. 1, with portions broken away.

FIG. 3 is a detailed view of the radiation receiver of the present invention.

FIG. 4 is a schematic illustration of the solar electricity generating system of the present invention.

FIG. 5 is a schematic illustration of an alternate electricity generating system constructed in accordance with the principles of the present invention, and employing a thermal mass heat storage element.

DESCRIPTION OF THE SPECIFIC EMBODIMENTS

Referring to FIG. 1, a solar central receiver plant 10 includes a tower 12 and an equipment enclosure or housing 14 mounted on the upper end of the tower. The tower 12 includes a base 16 which is mounted on the ground G in a suitable manner to support the structure under the particular weather and geologic conditions encountered at the site. The receiver tower 12 will typically be at least several hundred feet in height, usually being at least 500 feet in height, or more, depending on the power capacity of the plant 10.

The central receiver plant 10 is located adjacent a solar collector field (not illustrated) including a plurality of individual heliostats which focus solar radiation into an aperture 18 in the enclosure 14, as will be described in greater detail hereinafter. The number of heliostats may vary from several hundred to several thousand, with individual heliostats usually having a mirror area from about 50 m² to 200 m², typically being about 100 m². The collector field may be spread over an arc of from about 60° to 180° emanating from the base 16 of the receiver tower 12, and may cover a total area in the range from about 100 to 400 acres. For a 40 MW electrical generating capability, a solar collector field covering an area of about 250 acres will usually be required.

Referring now to FIGS. 2 and 3, the enclosure 14 houses a heat exchanger 20, a start-up combustion unit 22 and a compressor, turbine, and generator set 24. A radiation receiver 30 is mounted on the side of enclosure 14 and connected to discharge a heated airstream to the heat exchanger 20. Air to the radiation receiver 30 is provided by turbine exhaust from the compressor, turbine, and generator set 24, as will be described in more detail hereinafter. A particle generator 32 is connected to inject particles, usually pyrolyzed carbon particles, into a portion of the airstream entering the radiation receiver 30.

Referring now in particular to FIG. 3, the radiation receiver 30 includes a housing having a front wall 32, a back wall 34, and side walls 36 (only one of which is visible in FIG. 3) which define a flowpath from the bottom 38 of the receiver to the top 40 of the receiver. The front wall 32 of the receiver includes aperture 18 and further includes an adjustable diverter plate 42 at its upper end.

The geometry of the housing is not critical, but the thickness of the flowpath between the front wall 32 and back wall 34 will generally be substantially less than the width (defined by the width of faces 32 and 34) and less than the length (defined by the length of faces 32 and 34). Usually, the length is at least ten times the thickness, while the width is at least five times the thickness. In this way, complete exposure of the flowing airstreams may be achieved in a relatively short residence time (usually in a range from about one-tenth to one second). The area of the aperture may vary considerably (depending on the desired power output) and will usually be in the range from about 50 m² to 250 m², usually being about 100 m².

Turbine exhaust enters the lower end 38 of the radiation receiver 30 where it is directed generally upward by a contoured plate 44. Additionally, the turbine exhaust is divided into a main airstream 46 and auxiliary airstream 48 by a partition plate 50. Particles are injected only into the main airstream 46 through a conduit 52 connected to the particle generator 32 (see FIG. 1). A baffle plate 54 directs the particles upstream on the upper side of partition plate 50 so that they are carried upward in the main airstream 46. Thus, the main airstream 46 will include a preselected concentration of particles, while the auxiliary airstream 48 will be substantially free from such particles.

An air inlet manifold 60 is provided adjacent the contoured plate 44. The manifold 60 is connected to an airblower 62 (FIG. 4) so that a third airstream may be directed upward through the radiation receiver 30 generally in the plane of the aperture 18. As described in more detail hereinbelow, the airstream directed through the manifold 60 acts as an air curtain which protects and buffers the inward airstreams 46 and 48 from disturbances from the ambient, particularly wind disturbances.

Referring now to FIG. 4, operation of the radiation receiver 30 and associated electrical generation equipment will be described in detail. Ambient air enters a first stage compressor 66 of the compressor, turbine, and generator set 24. After an initial stage of compression, the air is passed through an intercooler 67 and then into second stage compressor 68. Air discharged from the second stage compressor 68 is typically at a pressure in the range from about 75 to 500 psig, more typically in the range from about 150 to 300 psig.

Air from the second stage compressor 68 then passes through heat exchanger 20 where it is heated by a heated airstream emanating from the radiation receiver 30, as will be described in more detail hereinbelow. The heated, compressed airstream from heat exchanger 20 then passes to turbine unit 70 where it drives the compressors 66 and 68 as well as an electrical generator (not illustrated) which provides the desired electricity. The air exhaust from the turbine 70 then passes to the lower end of the radiation receiver 30, as described previously with reference to FIG. 3. Particles are injected into the main airstream 46 by particle generator 32 while the auxiliary airstream 48 remains substantially free from particles.

The particles injected in the main airstream 46 are intended to absorb solar radiation focused through the aperture 18 in the receiver wall 32. A wide variety of particles are suitable to absorb sunlight, including materials which are reactive with air, such as pyrolyzed carbon, and materials which are non-reactive with air, such as silicon carbide and other ceramic materials. Preferred is the use of pyrolyzed carbon particles which have a high intrinsic absorptivity and selectivity for solar radiation, which can be economically generated at the site of the apparatus, and which eventually oxidize leaving particle-free gas entering the heat exchanger 20. Pyrolyzed carbon particles may be generated from an organic feedstock, such as oil or natural gas, by passing the fuel through a high temperature, refractory-lined reactor. Some air is introduced to the reactor to produce carbon particles having a desired size, typically in the range from about 0.1 to 1.0 $\mu m$, more typically in the range from about 0.2 to 0.5 $\mu m$. Equipment suitable for generating carbon particles is described in U.S. Pat. No. 4,452,771, the disclosure of which is incorporated herein by reference.

The carbon particles are injected into the main airstream 46 at the concentration in the range from about 0.5 to about 3.0 grams per cubic meter, typically about 1.0 grams per cubic meter.

The total mass of flow rate of the turbine exhaust directed at the radiation receiver 30 will depend on the desired electrical production capacity of the plant 10. Typically, the flow rate may vary from about 50 kg/sec to about 300 kg/sec, more usually being in the range from about 75 kg/sec to 150 kg/sec. These flow rates correspond to systems having electrical generating capacity in the range from about 10 to 100 MW, more usually in the range from about 20 to 50 MW. The velocity of the airflow at the radiation receiver 30 will typically be in the range from about 20 to 100 m/sec, more usually in the range from about 40 to 60 m/sec. Usually, the auxiliary airstream 48 will comprise about 0.05 to 0.10 times that of the main airstream 46, and it may be desirable to provide a second source of air for the auxiliary airstream 48 in addition to or in place of the compressor exhaust.

The air curtain injected through manifold 60 will typically have a volumetric and mass flow rate at least equal to and as much as twice that of the turbine exhaust which carries the particles through the receiver. The initial flow velocity of the air curtain may be the same or greater than that of airstreams 46 and 48. Preferably, the flow rate of the air curtain is about equal to that of the adjacent airstreams 46 and 48 in order to isolate the main particle-laden airstream 46 from outside wind disturbances. The velocity of the air curtain, however, will decrease more rapidly than either the main or auxiliary airstreams 46 and 48, since the air curtain is not affected by the pressure gradient provided by fan 82 (FIG. 4).

As observed in FIG. 4, a particle cloud 80 is formed by the upward flow of the main particle-laden airstream 46 in the radiation receiver 30. As the particles and air travel upward through the receiver 30, they are heated and the particles are eventually oxidized, limiting the extent of the cloud as illustrated. The particle-laden airstream 46 spreads outward from the rear wall 34 and toward the aperture 18 due to the volumetric expansion of the air during heating.

The diverter plate 42 is adjusted, depending on the ambient wind conditions, to divide the upward flow of air, allowing the heated air to travel inward to the heat exchanger 20, while directing the auxiliary airstream and any mixed air curtain to the outside of the receiver. The heated air is drawn through the heat exchanger by a fan 82 and expelled through an exhaust port 83 to the ambient.

An alternate embodiment 100 of a solar central receiver tower is illustrated in FIG. 5. The receiver 100 includes a thermal mass 102 located in the body of the tower 112. By passing heated air 114 down through the thermal mass 110, a reservoir of heat is provided for times when solar radiation is unavailable. In such cases, aperture 118 can be closed by doors, and air cycled through the receiver 100, which air is heated by the thermal mass. After exiting the thermal mass 102, the air enters heat exchanger 120 where it acts to heat a compressed airstream, as described hereinbefore. The remaining operation of the system 100 is substantially the same as that of the system 10 described hereinbefore.

The system just described allows the attainment of air temperatures approaching 2000° C., usually being about 700° to 1700° C. Heat absorption in the darkened airstream takes place at solar flux levels greater than 2 MW/m$^2$, so that the size of the heat absorption region can be made quite small compared to that of conventional receivers. This is an advantage since the area subject to re-radiation and reflection losses is minimized. Moreover, heat absorption takes place in the airstream and away from receiver walls, so that the surfaces of the walls are cooler than those of the air temperature, further reducing radiative heat losses and simplifying the selection of materials. Finally, the ability to operate without a transparent lens or cover over the aperture in the solar receiver allows much higher operating temperatures and greatly reduces the cost of the solar central receiver.

Although the foregoing invention has been described in some detail by way of illustration and example for purposes of clarity of understanding, it will be obvious that certain changes and modifications may be practiced within the scope of the appended claims.

What is claimed is:

1. A radiation receiver comprising:
   a housing having an inlet, an outlet, and an open aperture;
   means for inducing flow of a main airstream having entrained particles from the inlet to the outlet in the housing; and
   means for inducing flow of an auxiliary airstream in a direction substantially parallel to the direction of the main airstream and being substantially free from particles through the housing intermediate the aperture and main airstream, whereby the main airstream may be heated by orienting the aperture toward a source of focused solar radiation and mixing of the heated main airstream with the ambient through the aperture in the housing is inhibited by the auxiliary airstream.

2. A radiation receiver as in claim 1, wherein the housing includes a pair of spaced-apart major faces with one of said faces having the aperture.

3. A radiation receiver as in claim 2, wherein the length of the housing is at least ten times and the width of the housing is at least five times the distance between the major faces.

4. A radiation receiver as in claim 1, wherein the means for inducing flow of the main airstream particle-laden gas includes an exhaust fan.

5. A radiation receiver as in claim 1, further including means for producing flow of an air curtain adjacent the auxiliary airstream, said air curtain inhibiting the effect of ambient wind on the main airstream.

6. A radiation receiver as in claim 1, further comprising a diverter plate adjustably mounted at the periphery of the aperture in the housing, said diverter plate being positionable to exclude unheated ambient air from the housing.

7. A method for generating a heated airstream, said method comprising:

- flowing a particle-laden main airstream through a housing having an open aperture disposed to receive focused solar radiation; and
- flowing a relatively particle-free auxiliary airstream through the housing adjacent the aperture and substantially parallel to the particle-laden gas stream, whereby the particle-free airstream inhibits mixing of the particle-laden airstream with ambient air while the particles in the particle-laden airstream are heated within the housing.

8. A method as in claim 7, wherein the mass flow rate of the particle-free auxiliary airstream is about 0.05 to 0.10 times that of the particle-laden airstream.

9. A method as in claim 7, further including providing an air curtain adjacent the auxiliary airstream in order in inhibit the effect of wind on the main airstream.

10. A method as in claim 7, wherein the initial flow velocity of the air curtain is about equal to that of the main and auxiliary airstreams.

11. A method as in claim 7, wherein the particles in the particle-laden main airstream are pyrolyzed carbon.

* * * * *